Oct. 16, 1928.  
K. W. SCHWARTZ  
1,688,060  
MANUFACTURE OF ARTICLES OF CELLULOSE ESTERS AND OF THEIR COMPOSITIONS  
Filed Nov. 23, 1926
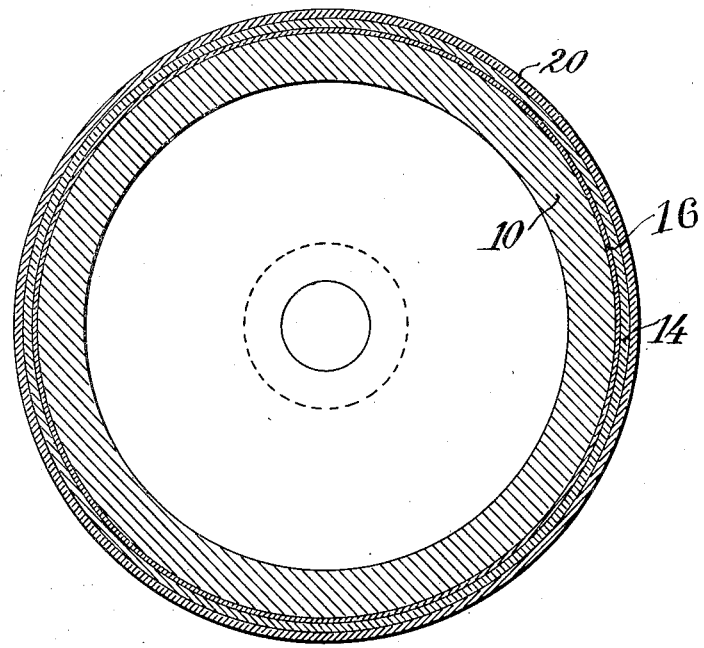
Kevie W. Schwartz, Inventor  
By his Attorney Gustave R. Thompson Patented Oct. 16, 1928.

1,688,060

UNITED STATES PATENT OFFICE.

KEVIE W. SCHWARTZ, OF NEW YORK, N. Y., ASSIGNOR, BY MESNE ASSIGNMENTS, TO UNITED CHROMIUM, INCORPORATED, OF NEW YORK, N. Y., A CORPORATION OF DELAWARE.

MANUFACTURE OF ARTICLES OF CELLULOSE ESTERS AND OF THEIR COMPOSITIONS.

Application filed November 23, 1926. Serial No. 150,364.

This invention relates to the manufacture or working of articles of cellulose-esters and of their compositions and the like, such as photographic films, celluloid products and the like.

The invention provides a method whereby improved products are obtained and greater facility obtained in the manufacture of such products.

In the manufacture of celluloid, photographic films, and other nitrocellulose products careful control of temperature, humidity, concentrations of solutions, etc. are very important factors in determining the quality of the resulting product. Other important features are the materials used as containers, rolls, conveyors, etc., in such equipment as is necessary to handle the various solutions in the manufacturing operations for such products.

The surface of materials entering into the construction of the apparatus must be resistant to the chemicals used, they must be durable, inexpensive and above all not cause sticking, or gumming of the viscous emulsions and solutions used in the making up of the final product. Such a contact surface is gotten by the use of chromium or chromium alloy equipment.

By electroplating chromium or an alloy thereof on such metal surfaces as iron, steel, silver, brass, copper, nickel or other metals a surface is produced which is hard, durable, wear resistant, corrosion resistant and in addition to all these advantages is also capable of taking a high lustrous, smooth finish.

In the film industry, for example, where celluloid film base is manufactured and where the film base must be perfectly smooth, glossy and free from any imperfection as far as texture is concerned so that the pictures produced from same shall be free from blots, blurs, etc., the formation and finishing of such material on chromium plated rolls, mandrels and the like presents a very practical, economical and desirable solution to a problem which has existed for many years.

The practice in the art at the present time is to use a steel or cast iron drum, which has been turned down to be smooth and true. This is then copper plated, and polished to produce a surface having the desired properties. This surface is then nickel plated and again polished. The resulting surface is then ready to use. Such a roll when placed in operation does not maintain its lustre (the nickel tarnishing), it is very difficult, expensive and troublesome to prepare same free from surface imperfections and on the whole offers a surface which is amenable to scratching from the doctor knife, peeling of the nickel, and shows a tendency for the film material to stick to the nickel causing much waste, expense and delay.

Chromium or chromium alloy surfaces obviate these difficulties. The chromium may be plated directly on the base metal or it may be plated over a layer of copper or over the two layers of copper and nickel. Such a surface because of its resistance to wear, its remarkable adherence to the metal it is plated on, and because of its high lustre and gloss, makes it an ideal surface for such work.

In addition to the above advantages it has the property of not causing the solutions to stick to it or gum, thereby facilitating cleaning of equipment, resulting in material saving of solvents, now a considerable expense in the industry.

Similarly in the celluloid sheet industry where celluloid stock is polished between polished nickel plated sheets of metal in hydraulic steam presses, wherein said stock is heated by steam until the material is plastic, and high pressure applied on the sandwiched sheets so that the glossy surface of the nickel is pressed against the celluloid imparting the necessary polish to the latter, the advantages of chromium or chromium alloyed surfaces are evident.

The nickel plated sheets tarnish, are easily scratched, peel and blister off the base metal, cause the celluloid stock to stick to them, preventing proper stripping, and offer operating difficulties which are eliminated by the use of chromium or chromium alloy surface.

An embodiment of a tool or implement according to the present invention is illustrated in the accompanying drawing, which shows in cross-section a steam-heated roller such as used in finishing the surface of photographic film-base.

Referring to said drawing, numeral 10 designates the roller of a suitable foundation metal, as for example steel or cast iron. The surface of this is coated with a plate of electrodeposited chromium 20. The roller under the chromium plate 20 is however preferably first coated with a metal softer than the chromium electrodeposit, preferably nickel.

The nickel-plate is designated by the numeral 14. A flash coat 16 of copper, as usual, is preferably applied to the surface of the roller 10 under the nickel coat 14. The thickness of the plates 14, 16 and 20 are shown exaggerated.

The surface of the chromium is made very smooth where the roll or other part is to be used for finishing the cellulose-ester product with a smooth even surface, as for example where a very fine, even, smooth surface is to be given a photographic film-base. This is preferably effected by highly polishing the surface on which the chromium plate is deposited, and the chromium is deposited according to known processes which give a smooth fine quality plate which faithfully represents the surface of the underlying finished surface. Where the chromium is deposited on the steel surface, for example, the steel surface is highly finished. Where the foundation metal is coated with a softer metal before chromium plating, as for example nickel, the high polish is imparted to the nickel, soft metals such as nickel being susceptible to taking a very high polish.

As heretofore pointed out, chromium electrodeposits have the advantage of not sticking to the pasty cellulose-esters and their compositions, of withstanding tarnishing by such compounds and their solvents, of maintaining a perfect smooth, even surface, and of being exceptionally durable.

The invention may receive other embodiments than that herein illustrated and specifically described.

What is claimed is:—

1. The method of finishing cellulose derivative products and the like, comprising subjecting the same to contact between tools or implements having a chromium surface.

2. The method of manufacturing cellulose derivative products and the like, comprising forming the cellulose-derivative material upon tools or implements having a chromium surface.

3. The method of manufacturing cellulose derivative products and the like, comprising forming the cellulose-derivative material upon tools or implements having a chromium surface, said chromium surface being electrodeposited chromium.

4. The method of making articles containing nitrocellulose which comprises producing a solution of the material of which the article is to be composed, contacting said solution with a chromium surface of proper shape to form the desired article and evaporating the solvent.

In witness whereof, I have hereunto signed my name.

KEVIE W. SCHWARTZ.